(12) United States Patent
Dwyer

(10) Patent No.: US 12,543,757 B2
(45) Date of Patent: Feb. 10, 2026

(54) CHOCOLATE-BASED MATERIAL PUZZLES

(71) Applicant: CHOUQUETTE LTD, Potomac, MD (US)

(72) Inventor: Sarah Dwyer, Potomac, MD (US)

(73) Assignee: CHOUQUETTE LTD, Potomac, MD (US)

( * ) Notice: Subject to any disclaimer, the term of this patent is extended or adjusted under 35 U.S.C. 154(b) by 1083 days.

(21) Appl. No.: 17/204,350

(22) Filed: Mar. 17, 2021

(65) Prior Publication Data

US 2022/0295817 A1 Sep. 22, 2022

(51) Int. Cl.
| | |
|---|---|
| *A23G 1/20* | (2006.01) |
| *A23G 1/50* | (2006.01) |
| *A63F 9/10* | (2006.01) |
| *A63F 9/12* | (2006.01) |
| *B65B 25/00* | (2006.01) |

(52) U.S. Cl.
CPC .............. *A23G 1/205* (2013.01); *A23G 1/50* (2013.01); *A63F 9/10* (2013.01); *A63F 9/12* (2013.01); *B65B 25/005* (2013.01); *A63F 2009/1072* (2013.01); *A63F 2009/1296* (2013.01); *A63F 2250/022* (2013.01)

(58) Field of Classification Search
CPC ... A23G 1/205; A63F 9/10; A63F 2009/1072; A63F 2250/022; A63F 9/12; B65B 25/005
See application file for complete search history.

(56) References Cited

U.S. PATENT DOCUMENTS

2008/0274241 A1* 11/2008 Steuer ................... A23G 1/30
　　　　　　　　　　　　　　　　　　　　　　426/231
2016/0219907 A1*  8/2016 Phillips ................. A23L 5/32

FOREIGN PATENT DOCUMENTS

| CA | 2015715 A1 * 10/1991 |
| JP | 3229370 U   * 12/2020 |
| KR | 200226635 Y1 * 12/2000 |

OTHER PUBLICATIONS

KR-200226635-Y1 (Clarivate machine translation) (Year: 2000).*
JP-3229370-U (Clarivate machine translation) (Year: 2020).*

* cited by examiner

*Primary Examiner* — Nikki H. Dees
*Assistant Examiner* — Andrew E Merriam
(74) *Attorney, Agent, or Firm* — PATENT PORTFOLIO BUILDERS PLLC

(57) ABSTRACT

A puzzle of chocolate-based material puzzle pieces is formed by providing a transfer sheet having a design of food-grade material on a first side of the transfer sheet and providing a puzzle piece template having passages shaped as pieces of the puzzle. The puzzle piece template is arranged on top of the first side of the transfer sheet. The passages of the puzzle piece template are filled with a chocolate-based material. After crystallization, the chocolate-based material in the passages of the puzzle piece template form the chocolate-based material puzzle pieces of the puzzle. The chocolate-based material puzzle pieces are removed from the template.

13 Claims, 7 Drawing Sheets

CHOCOLATE-BASED MATERIAL PUZZLES

BACKGROUND

Technical Field

Embodiments of the disclosed subject matter generally relate to a method for creating a puzzle comprised chocolate-based material puzzle pieces.

Discussion of the Background

The confectionary industry, and in particular the chocolate confectionary industry, has experienced tremendous growth due to the entry of a number of different artisanal producers, which, unlike large manufacturers, have focused on products using more expensive and higher quality ingredients. Within the artisanal chocolate industry, companies typically try to differentiate their products from those of their competitors based on the quality of ingredients, the particular combination of ingredients, as well as the decoration of the top surface of the chocolate product. While mass-produced chocolate products typically provide the decoration by physically altering the upper surface with a pattern, such as the name of the producer, artisanal chocolate products typically provide the decoration on the top surface using a food grade material, such as cocoa butter. The use of food grade materials for decorating the top surface of a chocolate product provides many options for differentiation from competitors, such as designs having particular phrases or even customized using a person's name or likeness.

It would be desirable to provide ways for further differentiation of chocolate products within the chocolate confectionary industry.

SUMMARY

According to an embodiment, there is a method for creating a puzzle comprised of chocolate-based material puzzle pieces. A transfer sheet having a design of food-grade material on a first side of the transfer sheet is provided. A puzzle piece template having passages shaped as pieces of the puzzle is also provided. The puzzle piece template is arranged on top of the first side of the transfer sheet. The passages of the puzzle piece template are filled with a chocolate-based material. After crystallization, the chocolate-based material in the passages of the puzzle piece template form the chocolate-based material puzzle pieces of the puzzle. The chocolate-based material puzzle pieces are removed from the template.

According to another embodiment, there is a system for creating a puzzle comprised of chocolate-based material puzzle pieces. The system includes a transfer sheet having a design of food-grade material on a first side of the transfer sheet, a puzzle piece template having passages shaped as pieces of the puzzle, and a chocolate-based material.

According to a further embodiment, there is a puzzle piece template for forming a chocolate material-based puzzle. The puzzle piece template includes a body comprising food-safe material and a plurality of passages passing through the body. Each of the plurality of passages has a unique shape and is separated from other of the plurality of passages by portions of the body.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of chocolate-based material puzzles.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
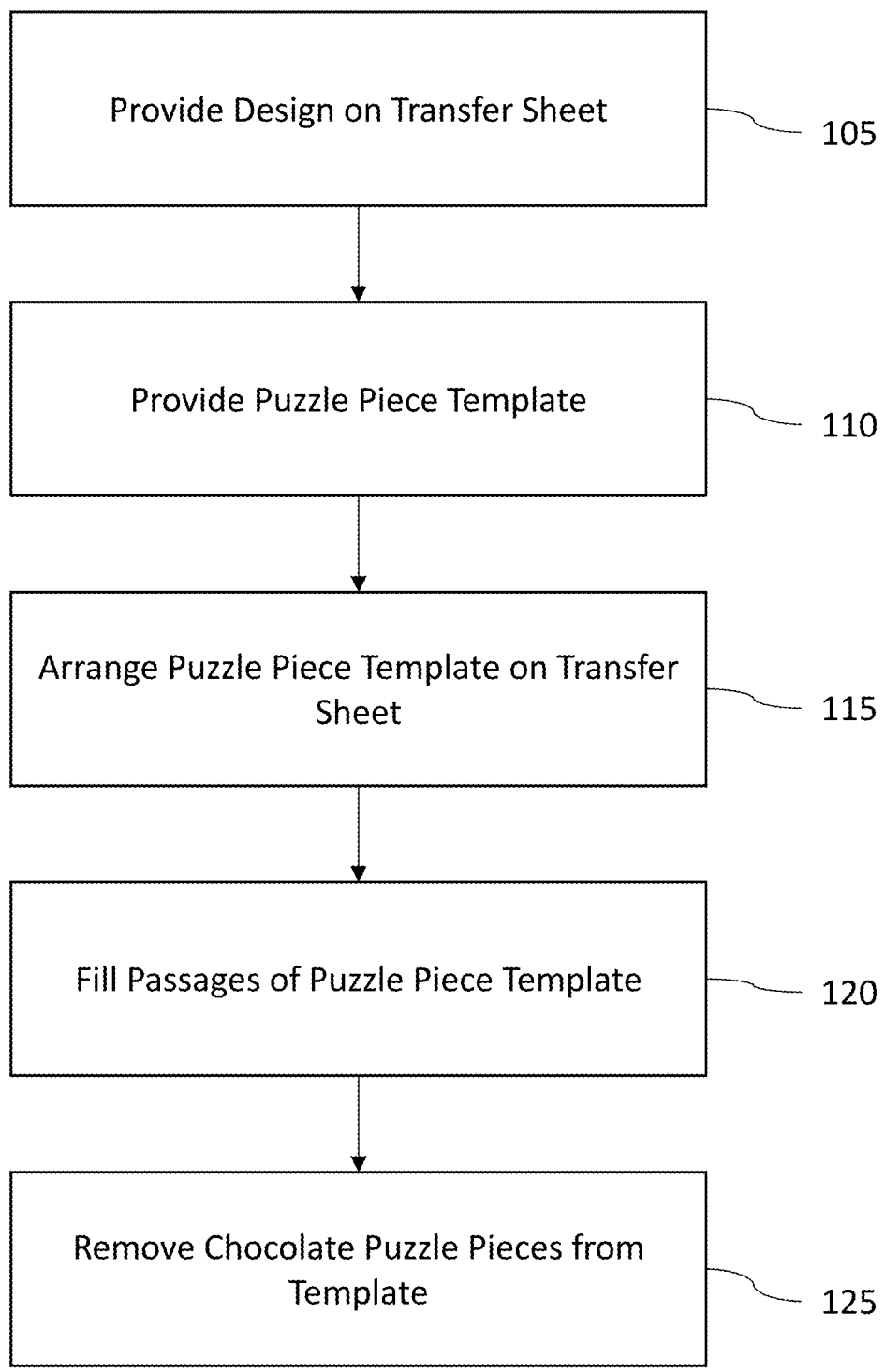
FIG. 1 is a flowchart of a method for creating a puzzle comprised of chocolate-based material puzzle pieces according to embodiments.
Figure 2A:
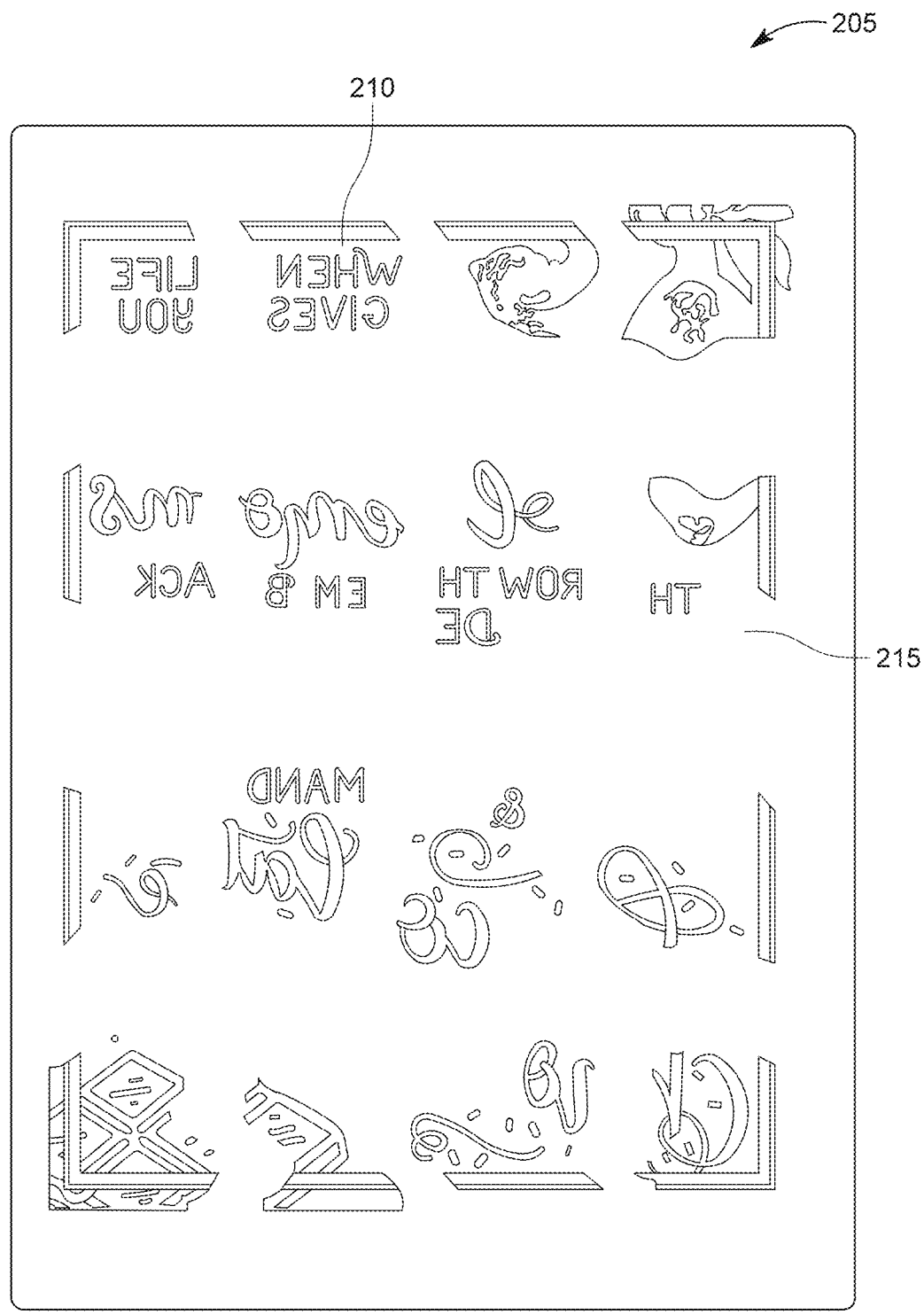
FIGS. 2A-2E are photographs of a method for creating a puzzle comprised of chocolate-based material puzzle pieces according to embodiments.

Exemplary embodiments are directed to a method and system for creating a puzzle comprised of chocolate-based material puzzle pieces, which will be described in detail in connection with FIGS. 1 and 2A-2E. Referring initially to FIGS. 1 and 2A, a transfer sheet 215 is provided (step 105). The transfer sheet 215 has a design 205 of food-grade material 210 on a first side of a transfer sheet 215. In a non-limiting embodiment, the food-grade material 210 can be cocoa butter. However, other food-grade materials can be employed in addition to or as an alternative to cocoa butter. The transfer sheet can be comprised of any type of food contact surface that is food safe, which are commonly understood terms in the industry that are defined by the U.S. Food and Drug Administration. The surface on which the design is applied should also be designed to withstand the heat of the liquid chocolate-based material without being affected, as well as allowing for the release of the design 205 onto the chocolate-based material. It should be recognized that providing a transfer sheet can include obtaining a transfer sheet already having a design, as well as applying a design to a blank transfer sheet.

Because the pattern is applied to the top surface of the chocolate-based material puzzle pieces, the design 205 should appear inverted when viewed from the first side of the transfer sheet so that the design 205 appears correctly when later applied to the top surface of the chocolate-based material pieces. Further, as will be appreciated from the discussion below, as well as from the exemplary design 205 on transfer sheet 215, the design 205 is arranged based upon the location of the different puzzle pieces in the puzzle piece template 220 so that when the chocolate-based material puzzle pieces are placed adjacent or connected to each other, the design 205 appears as if were applied to the top surface of the puzzle while the puzzle is completed, i.e., all of the puzzle pieces being placed adjacent or connected to each other. In this case the passages 225 are arranged in the puzzle piece template 220 in the same arrangement as the chocolate-based material puzzle pieces are arranged in the final puzzle so that the design 205 appears as intended. However, because (as discussed below) there is spacing between adjacent chocolate-based material puzzle pieces in the template 220 but the formed chocolate-based material puzzle has the pieces directly adjacent to each other, the design 205 must account for the spacing between adjacent chocolate-based material puzzle pieces in the puzzle piece template 220. In one embodiment, this is achieved by vectorizing the design 205 to match the layout of the passages 225 in the puzzle piece template 220. The vectorization can be performed using any number of programs that are executed by a processor (e.g., a processor of a computer, handheld, and/or mobile device) to vectorize the original design that is arranged assuming that the chocolate-based material puzzle pieces are directly adjacent to each other. The design 205 can be applied to the transfer sheet 215 using any technique or machine that can apply employ the vectorized design to apply a food-based material on the first side of the transfer sheet 215.

Figure 2B:
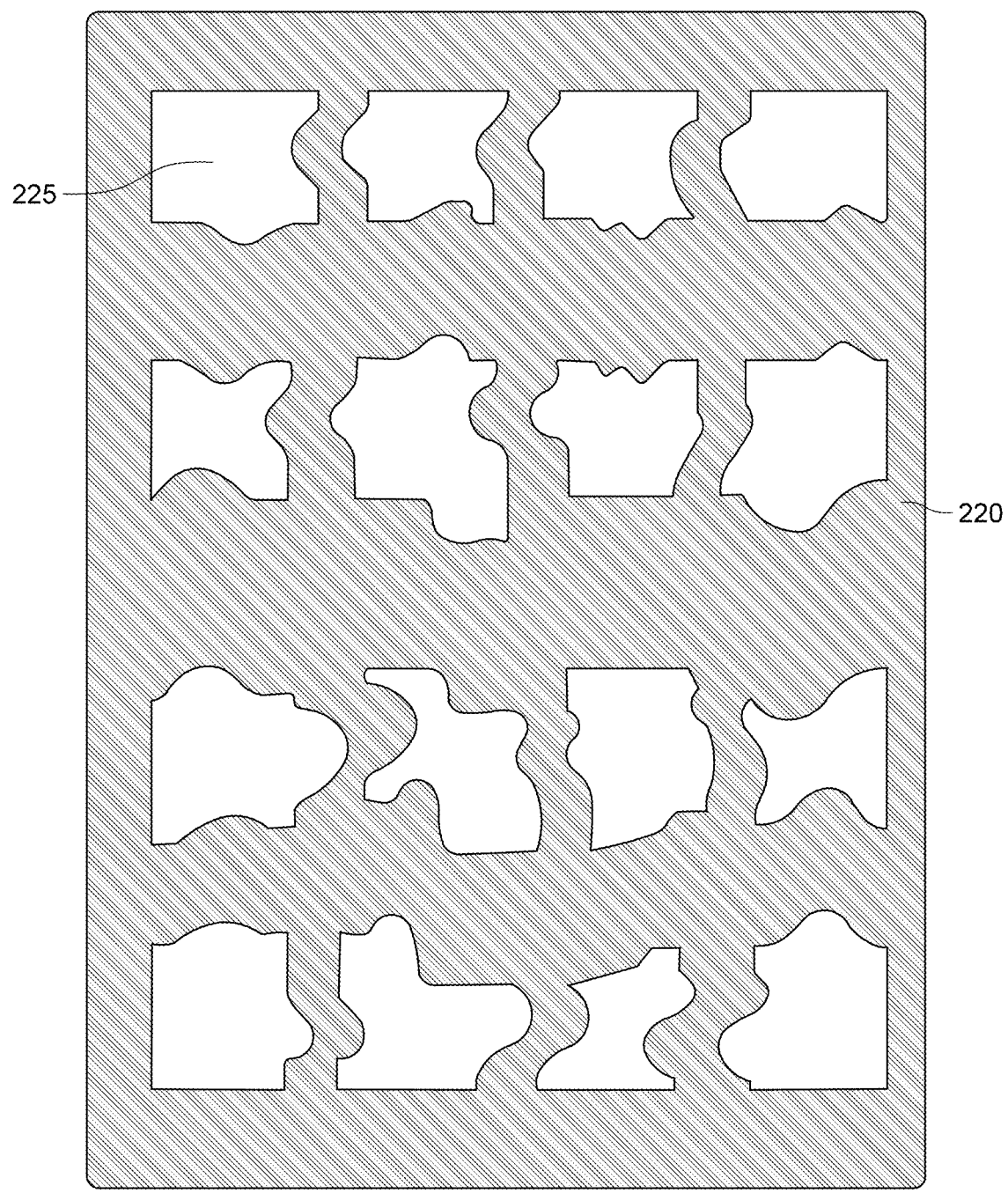

A puzzle piece template 220 is also provided (step 110 and FIG. 2B). The puzzle piece template 220 has passages 225 shaped as pieces of the puzzle. Each of the passages 225 are separated from each other by a portion of the puzzle piece template 220. The template can be made of rubber, acrylic, polycarbonate, or any other food-safe material that can withstand the heat of the liquid chocolate-based material and also allow the individual pieces to be easily dislodged from the passages without damaging the shape of each of the individual pieces. In the embodiment illustrated in FIG. 2B, each passage 225 has a unique shape, which is particularly advantageous because, due to the relatively small size of the puzzle, a chocolate-based material puzzle having one or more pieces having identical shapes would not have a particularly pleasing aesthetic, whereas all pieces having a unique shape provides a chocolate-based material puzzle that looks more like what a person would expect a puzzle to look like. Further, the use of unique pieces within the chocolate-based material puzzle ensures that the individual pieces can only be arranged in one pattern to form the completed puzzle, whereas duplicated pieces would allow multiple solutions to the puzzle.

Figure 2C:
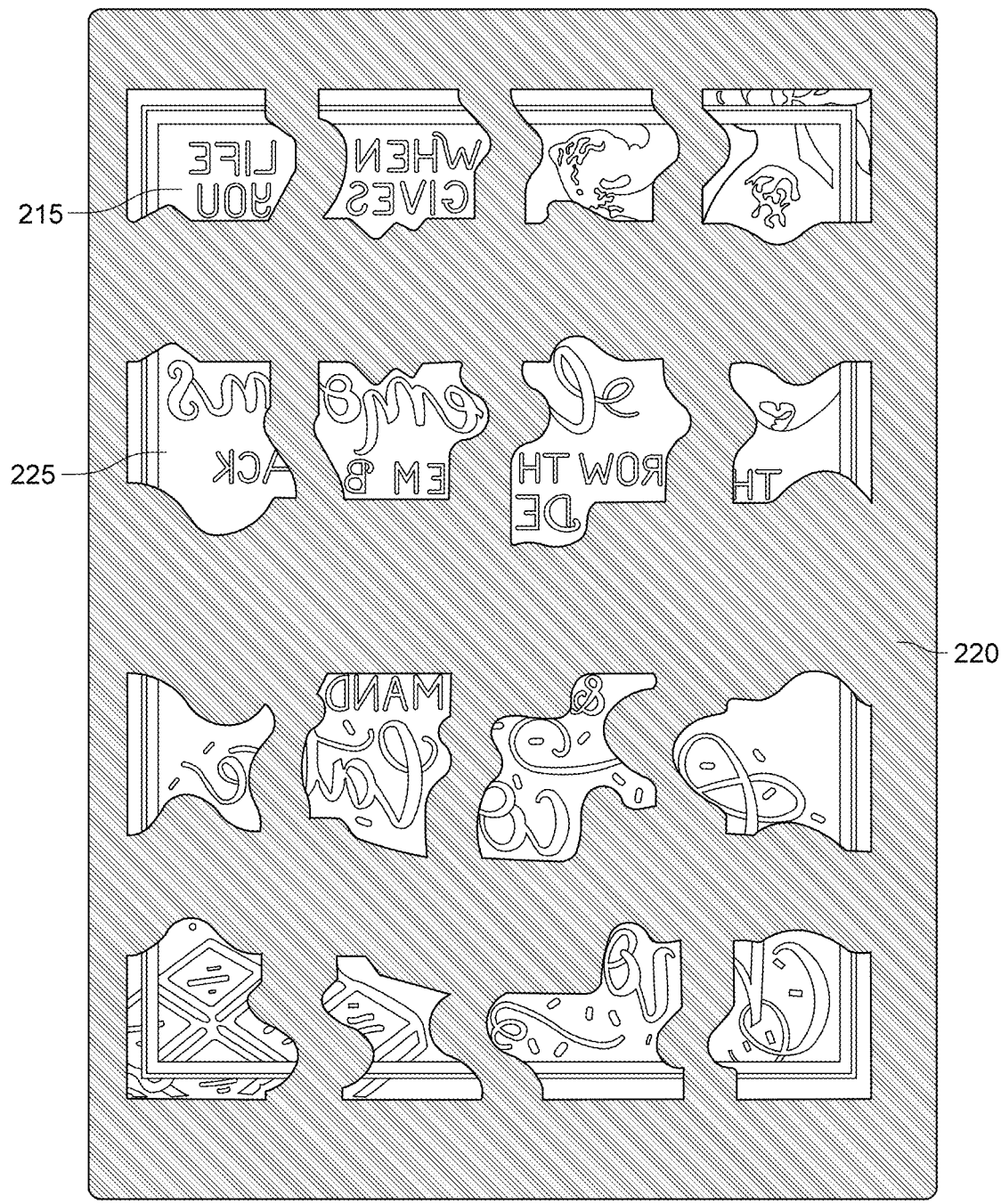
Figure 2D:
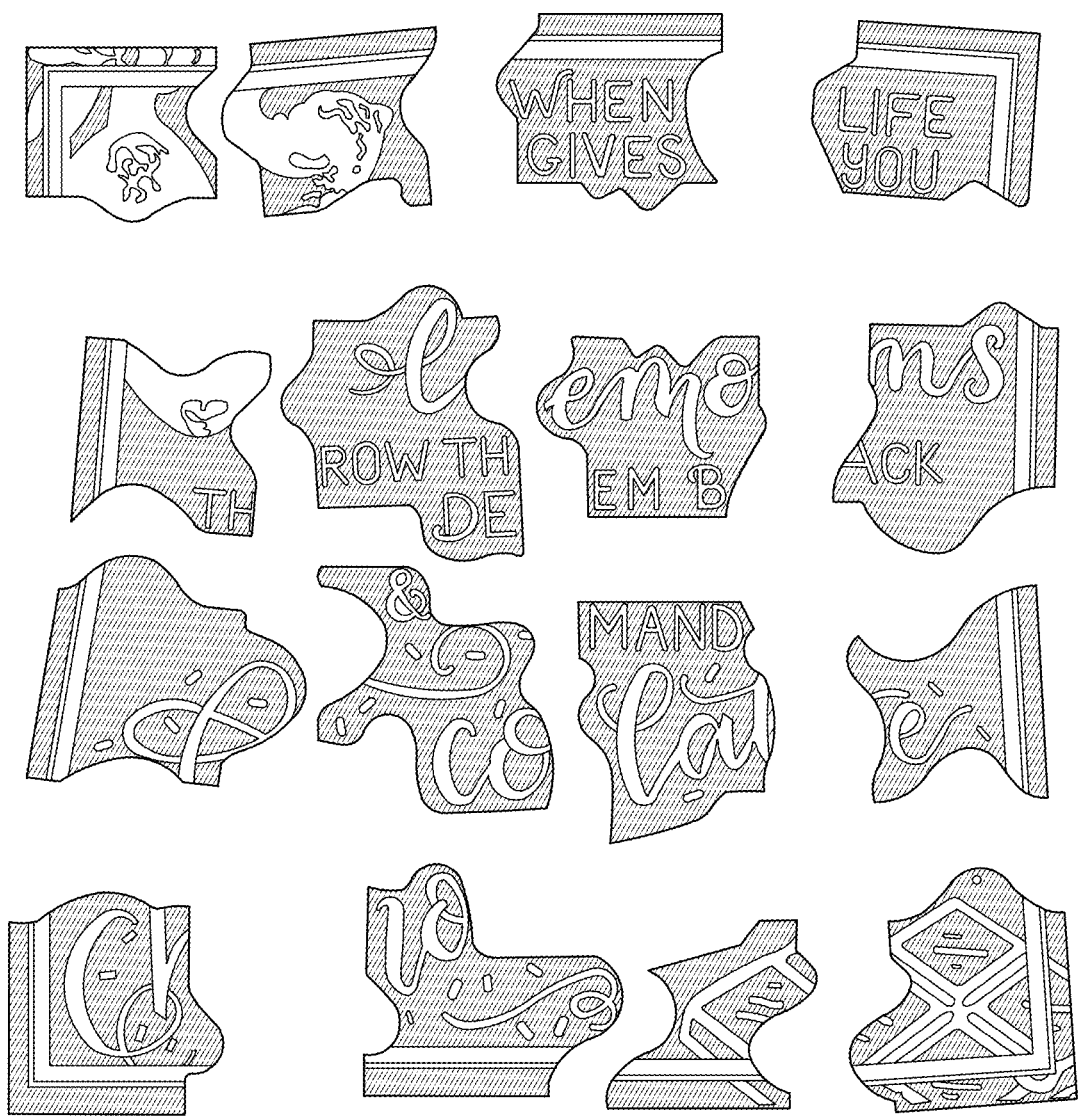

The puzzle piece template 220 is then arranged on top of the first side of the transfer sheet 215 (step 115 and FIG. 2C). The passages 225 of the puzzle piece template 220 are filled with a chocolate-based material (step 120). The chocolate-based material can be pure chocolate or a combination of chocolate and one or more other food grade materials, for example to provide an additional flavor (e.g., a fruit flavor, fruit, nuts, coffee flavor, coffee beans, etc.) to the chocolate pieces.

The heat from the chocolate-based material poured into the passages 225 of the puzzle piece template 220 causes the design 205 to release from the transfer sheet 215 and become adhered to the adjoining faces of the chocolate-based material puzzle pieces. Assuming, for example, that the food-grade material 210 of design 205 is composed of cocoa butter, the required heat from the chocolate to release the cocoa butter from the transfer sheet 215 should be between 87° F. and 96° F., and more preferably between 90° F. and 93° F. Other food-grade material may have different temperatures required for release from the transfer sheet 215 and one of ordinary skill in the art is familiar with how to determine the appropriate temperature for other food-grade material.

Figure 2E:
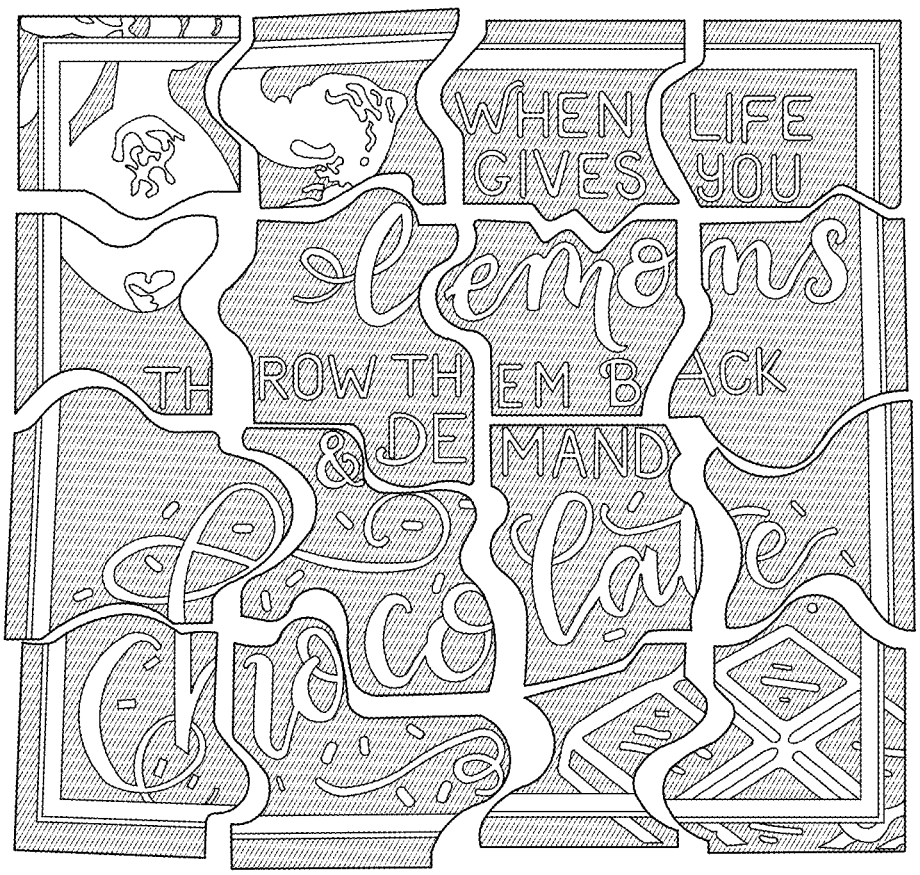

Any excess chocolate-based material that extends above the passages 225 onto the top of the puzzle piece template 220 can then be scraped off so that the chocolate material-based puzzle pieces have a substantially flat bottom side (i.e., the side opposite of the side on which the design 205 is applied). If, however, the passages 225 are filled using an automatic filling machine, then scraping is not typically required because the automatic filling machine can precisely fill the passages so that the chocolate-based material in the passages is coextensive with the upper surface of the puzzle piece template 220. The puzzle piece template 220 is then left for a period of time so that the chocolate-based material cools and crystalizes. After crystallization, the chocolate-based material in the passages 225 of the puzzle piece template 220 form the chocolate-based material puzzle pieces of the puzzle. Finally, the chocolate-based material puzzle pieces are removed from the puzzle piece template (step 125 and FIG. 2D). The chocolate-based material puzzle pieces can then be packaged. This can involve arranging all of the chocolate-based material puzzle pieces relative to each other to form the puzzle (e.g., as illustrated in FIG. 2E) and then packaging the puzzle or the loose chocolate-based material puzzle pieces can be packaged without forming the puzzle.

Although exemplary embodiments are described in connection with a square shaped puzzle, the disclosed method and system can be used to form a puzzle of any geometric shape. Further, the particular shapes of the puzzle pieces illustrated in the figures are non-limiting examples and other shapes can be employed. For example, although the illustrated puzzle is comprised of chocolate-based material puzzle pieces having shapes so that the pieces are arranged adjacent to each other, the chocolate-based material puzzle pieces can have shapes designed to be connected to each other using, for example, corresponding locking shapes on two adjacent chocolate-based material puzzle pieces.

The exemplary embodiment involved forming a two-dimensional puzzle with the chocolate-based material puzzle pieces are arranged to form a puzzle in two dimensions. However, exemplary embodiments can also involve a three-dimensional puzzle in which the chocolate-based material puzzle pieces are arranged to form a puzzle in three dimensions. This can be achieved in a number of different ways. In one non-limiting example, the three-dimensional shape can be a cube and each side of the cube can be comprised of chocolate-based material puzzle pieces from a puzzle piece template for that side. In this case, different designs can be arranged on different sides of the cube by performing steps 105-125 for each side using a transfer sheet and puzzle piece template designed for each particular side.

Further, a three-dimensional puzzle can be formed using passages designed to form at least two of the chocolate-based material puzzle pieces from different puzzle piece templates having corresponding connecting pieces. Specifically, referring to a puzzle piece template arranged on a flat surface and extending in the x-y directions, a portion of a passage can occupy some but not all of the passage in the z direction. For example, referring to FIG. 3A, the passage can include an upper portion 305 comprising a solid material through which a cylindrical passage 310 passes and is fluidically connected to an open lower portion 315. Accordingly, when chocolate-based material is poured into the cylindrical passage 310, the chocolate-based material passes through this passage, fills the open lower portion 315, and once the open lower portion 315 is filled, the cylindrical passage 310 is filled. The resulting chocolate-based material puzzle piece is illustrated in FIG. 3B. Thus, a puzzle piece template passage for a chocolate-based material puzzle piece that is adjacent or connected to the chocolate-based material puzzle piece illustrated in FIG. 3B would have an inverse upper portion so that chocolate-based material does not fill parts of the upper portion corresponding to the protrusion formed by the cylindrical passage.

Figure 3A:
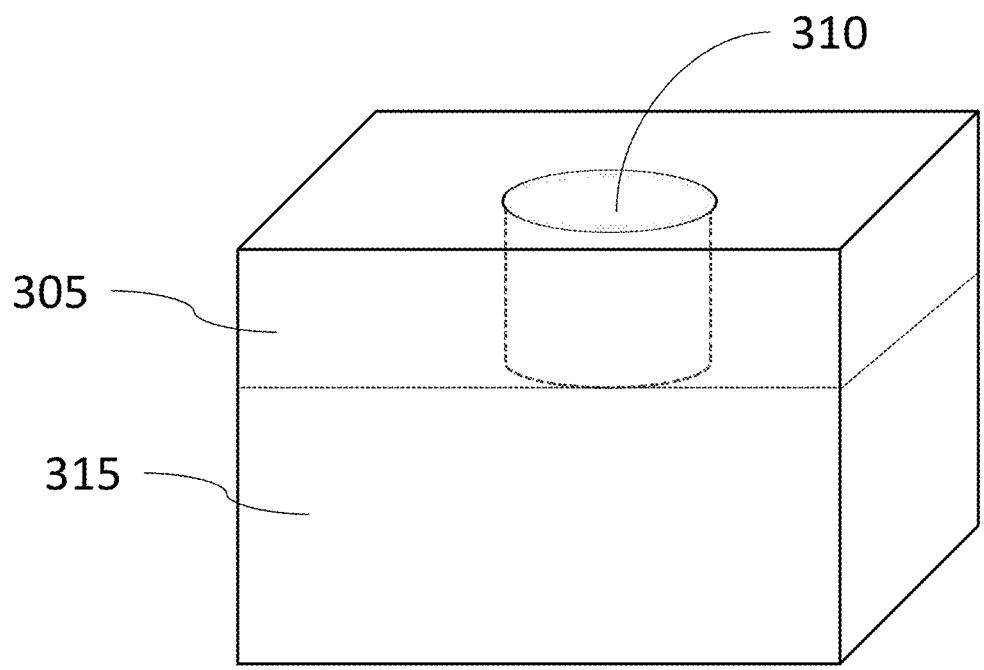
FIGS. 3A and 3B are block diagrams of an exemplary puzzle piece template passage for a three-dimensional chocolate-based material puzzle piece and the correspondingly formed puzzle piece, respectively, according to embodiments.
Figure 3B:
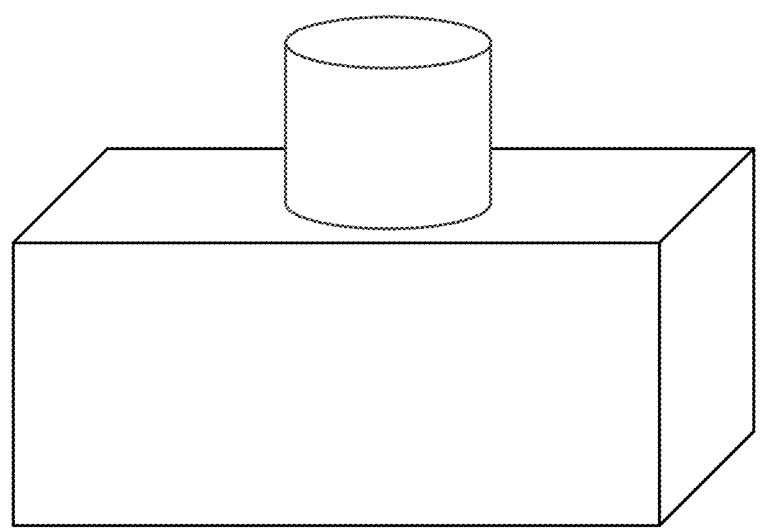

The puzzle piece template passage and resultant chocolate-based material puzzle piece illustrated in FIGS. 3A and 3B are non-limiting examples and the three-dimensional chocolate-based material puzzle pieces and the puzzle piece template passages can have other shapes than those illustrated.

Although exemplary embodiments have been described as using a single transfer sheet and single template to form a puzzle, a puzzle can be formed using multiple templates and transfer sheets. This is particularly advantageous when the final puzzle is larger than a conventional block of chocolate, such as when the final puzzle weighs more than approximately 8 oz. Specifically, the puzzle piece templates can be flexible, in which a single template may not have sufficient structural rigidity to ensure that all of the chocolate material-based pieces are formed correctly. Thus, employing multiple puzzle piece templates allows for forming larger puzzles while still achieving chocolate material-based puzzle pieces that conform to the shape of the corresponding passages.

The disclosed embodiments provide a method and system for creating a puzzle comprised of chocolate-based material puzzle pieces. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, the method comprising:
    providing a transfer sheet having a design of a food-grade material on a first side of the transfer sheet;
    providing a puzzle piece template having passages shaped as pieces of a puzzle;
    arranging the puzzle piece template on top of the first side of the transfer sheet;
    filling the passages of the puzzle piece template with a chocolate-based material, wherein, after crystallization, the chocolate-based material in the passages of the puzzle piece template form chocolate-based material puzzle pieces of a puzzle; and
    removing the chocolate-based material puzzle pieces from the template.

2. The method of claim 1, further comprising:
    arranging the chocolate-based material puzzle pieces relative to each other to form the puzzle; and
    packaging the puzzle.

3. The method of claim 1, further comprising:
    packaging the chocolate-based material puzzle pieces, wherein the packaged chocolate-based material puzzle pieces are not connected to each other to form the puzzle in a completed form.

4. The method of claim 1, wherein after the passages of the puzzle piece template are filled with the chocolate-based material, the method further comprising:
    scraping excess chocolate-based material from a side of the template opposite to a side of the template that is on top of the first side of the transfer sheet.

5. The method of claim 1, wherein the passages are filled with the chocolate-based material using an automatic filling machine that fills the passages to a height within the puzzle piece template that is coextensive with a side of the puzzle piece template that is opposite of a side of the puzzle piece template that is arranged on top of the first side of the transfer sheet.

6. The method of claim 1, wherein the providing of the transfer sheet comprises:
    receiving a design;
    vectorizing the design; and
    applying the vectorized design on the first side of the transfer sheet in the form of the design of food-grade material.

7. The method of claim 1, wherein each of the passages of the puzzle piece template has a unique shape.

8. The method of claim 7, wherein each of the passages of the puzzle piece template is separated from each of the other passages by a material of the puzzle piece template.

9. The method of claim 1, wherein the puzzle is a two-dimensional puzzle in which the chocolate-based material puzzle pieces form the puzzle in two dimensions.

10. The method of claim 1, wherein the puzzle is a three-dimensional puzzle in which the chocolate-based material puzzle pieces form the puzzle in three dimensions such that at least two of the chocolate-based material puzzle pieces connect horizontally and another at least two of the chocolate-based material puzzle pieces connect vertically.

11. The method of claim 1, wherein the food-grade material of the design comprises cocoa butter.

12. The method of claim 11, wherein a material of the transfer sheet and the puzzle piece template is a food-safe material.

13. The method of claim 1, wherein the design of food-grade material is released onto the chocolate-based material.

\* \* \* \* \*